United States Patent [19]
Yamamura et al.

[11] Patent Number: 4,770,926

[45] Date of Patent: Sep. 13, 1988

[54] HYBRID FIBER-REINFORCED PLASTIC COMPOSITE MATERIAL

[75] Inventors: Takemi Yamamura; Masahiro Tokuse; Teruhisa Furushima, all of Ube, Japan

[73] Assignee: Ube Industries Ltd., Ube, Japan

[21] Appl. No.: 879,068

[22] Filed: Jun. 26, 1986

[30] Foreign Application Priority Data

Jul. 3, 1985 [JP] Japan ................ 60-144482

[51] Int. Cl.$^4$ .................................. D03D 3/00
[52] U.S. Cl. .................... 428/224; 428/238; 428/245; 428/260; 428/284; 428/367; 428/373; 428/374; 428/392; 428/408; 501/80; 501/90; 501/96; 523/458; 524/443; 524/730
[58] Field of Search .............. 428/238, 245, 260, 284, 428/408, 367, 392, 374, 373; 524/730, 443; 523/458; 501/88, 90, 96

[56] References Cited

U.S. PATENT DOCUMENTS

| | | | |
|---|---|---|---|
| 3,778,334 | 12/1973 | Sturgeon | 428/367 |
| 4,122,139 | 10/1978 | Yajima et al. | 264/63 |
| 4,342,712 | 8/1982 | Yajima et al. | 501/38 |
| 4,399,232 | 8/1983 | Yajima et al. | 501/38 |
| 4,463,058 | 7/1984 | Hood et al. | 501/88 |
| 4,489,190 | 12/1986 | Froix | 524/443 |
| 4,508,777 | 4/1985 | Yamamoto et al. | 428/224 |
| 4,550,130 | 10/1985 | Kishida et al. | 524/443 |
| 4,556,526 | 12/1985 | Yajima et al. | 501/91 |
| 4,610,917 | 9/1986 | Yamamura et al. | 428/224 |
| 4,618,529 | 10/1986 | Yamamura et al. | 428/408 |
| 4,622,270 | 11/1986 | Yamamura et al. | 428/608 |

*Primary Examiner*—Sharon A. Gibson
*Attorney, Agent, or Firm*—Ladas & Parry

[57] ABSTRACT

A hybrid fiber-reinforced plastic composite material comprising a matrix of a plastic and hybrid fibers consisting of inorganic fibers and at least one kind of fibers selected from the group consisting of carbon fibers, glass fibers, boron fibers, aramide fibers and silicon carbide fibers having a carbon core, wherein (a) the inorganic fibers are inorganic fibers containing silicon, either titanium or zirconium, carbon and oxygen and being composed of
 (i) an amorphous material consisting substantially of Si, M, C and O where M represents Ti or Zr, or
 (ii) an aggregate consisting substantially of ultrafine crystalline particles with a particle diameter of not more than 500 Å of $\beta$-SiC, MC, a solid solution of $\beta$-SiC and MC and MC$_{1-x}$, and amorphous SiO$_2$ and MO$_2$, where M is as defined and x is a number represented by $0<x<1$, or
 (iii) a mixture of the amorphous material (i) and the aggregate (ii),
(b) the composite material has an interlayer shear strength of at least about 9 kg/mm$^2$, and
(c) the composite material has a flexural impact value of at least about 250 kg-cm/cm$^2$.

8 Claims, 1 Drawing Sheet

HYBRID FIBER-REINFORCED PLASTIC COMPOSITE MATERIAL

BACKGROUND OF THE INVENTION

1. Field of the Invention

This invention relates to a hybrid fiber-reinforced plastic composite material having excellent mechanical properties composed of a plastic matrix and as a reinforcing material, hybrid fibers consisting of inorganic fibers composed mainly of silicon, either titanium or zirconium, carbon and oxygen and at least one kind of fibers selected from the group consisting of carbon fibers, glass fibers, boron fibers, aramide fibers and silicon carbide fibers having a carbon core.

2. Description of the Prior Art

Research work has been under way on hybrid fiber-reinforced plastic composite materials which contain at least two kinds of fibers in the matrix as a reinforcing material in order to utilize the properties of the individual materials. For example, carbon/glass fibers, carbon/aramide fibers (Kevlar), boron/carbon fibers, boron/Kevlar fibers, boron/glass fibers, ceramic/Kevlar fibers and Kevlar/glass fibers have been studied as hybrid fibers for reinforcing such plastics as epoxy resins, modified epoxy resins, polyester resins and polyimide resins. The carbon/glass and carbon/Kevlar combinations have been most studied and gained practical applications.

When carbon fibers are used, their surface must be treated because their wettability with resins is inferior. A composite material obtained by using surface-treated carbon fibers, however, has a low interlayer shear strength and a low tensile strength in a direction perpendicular to the fibers. Hence, the fibers are liable to come off, and the composite material has a low fatigue strength and a low flexural impact value. Hence, the composite material is susceptible to fracture. With glass fibers, a sufficient reinforcing effect cannot be obtained because of their low tensile strength and modulus. Boron fibers and silicon carbide fibers having a carbon core cannot be used in bent portions of a complex shape because of their large diameters. Aramide fibers are weak to compression, and a composite material obtained by using them has low fatigue resistance.

According to this invention, specific inorganic fibers composed mainly of silicon, either titanium or zirconium, carbon and oxygen are used as one component of the hybrid fibers. Since these inorgnaic fibers have high strength of bonding to plastics and superior flexibility, they can be easily spun, and make up for the inherent defects of the other fibers described above and thus increase the reinforcing effect of these fibers. One example of applying the inorgnic fibers used in this invention as a plastic reinforcing material is described in Japanese Patent Application No. 11134/1985.

SUMMARY OF THE INVENTION

It is an object of this invention therefore to provide a hybrid fiber-reinforced plastic composite material which are excellent in mechanical properties such as interlayer shear strength and flexural impact Another object of this invention is to provide a hybrid fiber-reinforced plastic composite material obtained by using hybrid fibers having a superior reinforcing efficiency.

Still another object of this invention is to provide a hybrid fiber-reinforced plastic composite material obtained by using hybrid fibers which do not particularly require surface treatment.

Yet another object of this invention is to provide a hybrid fiber-reinforced plastic composite material which can be molded into articles of complex According to this invention, there is provided a hybrid fiber-reinforced plastic composite material comprising a matrix of a plastic and hybrid fibers consisting of inorganic fibers and at least one kind of fibers selected from the group consisting of carbon fibers, glass fibers, boron fibers, aramide fibers and silicon carbide fibers having a carbon core, wherein (a) the inorganic fibers are inorganic fibers containing silicon, either titanium or zirconium, carbon and oxygen and being composed of
  (i) an amorphous material consisting substantially of Si, M, C and O where M represents Ti or Zr, or
  (ii) an aggregate consisting substantially of ultrafine crystalline particles with a particle diameter of not more than 500 Å of $\beta$-SiC, MC, a solid solution of $\beta$-SiC and MC and $MC_{1-x}$, and amorphous $SiO_2$ and $MO_2$, where M is as defined, and x is a number represented by $0 < x < 1$, or
  (iii) a mixture of the amorphous material (i) and the aggregate (ii), (b) the composite material has an interlayer shear strength of at least about 9 kg/mm$^2$, and (c) the composite material has a flexural impact value of at least about 250 kg-cm/cm$^2$.

DETAILED DESCRIPTION OF THE INVENTION

Figure 1A:
FIG. 1(a)–(f) is a view showing examples of the type of hybrid fibers, in which blank areas show inorganic fibers; black areas, other fibers; and hatched areas, a mixture of the inorganic fibers and other fibers.

The inorganic fibers used in this invention are described in European Pat. Nos. 30145 and 37249, and can be produced by the following methods.

Inorganic fibers consisting substantially of Si, Ti, C and O or of Si, Zr, C and O can be produced by a method which comprises:

a first step of mixing (1) a polycarbosilane having a number average molecular weight of about 500 to 10,000 and a main-chain skeleton composed mainly of structural units of the formula $-(Si-CH_2)-$ in which the silicon atom substantially has two side-chain groups selected from the class consisting of hydrogen atoms, lower alkyl groups and phenyl groups with (2) a polymetallosiloxane having a number average molecular weight of about 500 to 10,000 and a main-chain skeleton composed of metalloxane units of the formula $-(M-O)-$ where M represents Ti or Zr and siloxane units of the formula $-(Si-O)-$, the ratio of the total number of the metalloxane units to that of the siloxane units being in the range of from 30:1 to 1:30, most of the silicon atoms of the siloxane units having 1 or 2 side-chain groups selected from the class consisting of lower alkyl and phenyl groups and most of the metal atoms of the metalloxane units having 1 or 2 lower alkoxy groups as side-chain groups, in such a mixing ratio that the ratio of the total number of the $-(Si-CH_2)-$ structural units of the polycarbosilane to the total number of the $-(M-O)-$ units and the $-(M-O)-$ units and the $-(Si-O)-$ units is in the range of from 100:1 to 1:100, and heating the resulting mixture in an organic solvent in an atmosphere inert to the reaction to bond at least some of the silicon atoms of the polycarbosilane to at least some of the silicon atoms and/or metal atoms of the polymetallosiloxane through oxygen atoms and thereby form an organic metal polymer having a number average molecular weight of about 1000 to 50,000 and composed of a crosslinked polycarbosilane moiety and polymetallosiloxane moiety;

a second step of preparing a spinning dope of the resulting polymer and spinning it;

a third step of rendering the spun fibers infusible under tension or under no tension; and a fourth step of calcining the infusible fibers in vacuum or in an atmosphere of an inert gas at a temperature in the range of 800° to 1800° C.

Alternatively, the inorganic fibers consisting substantially of Si, Ti, C and O or of Si, Zr, C and O can be produced by a process which comprises:

a first step of mixing a polycarbosilane having a number average molecular weight of 200 to 10,000 and mainly containing a main-chain skeleton represented by the general formula

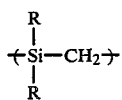

wherein R represents a hydrogen atom, a lower alkyl group or a phenyl group, and an organic metal compound represented by the general formula $$MX_4$$

wherein M represents Ti or Zr and X represents an alkoxy group containing 1 to 20 carbon atoms, a phenoxy group, or an acetylacetoxy group, in such a mixing ratio that the ratio of the total number of the structural units of the formula  to the total number of the structural units of the formula $-(M-O)-$ of the organic metal compound is in the range of from 2:1 to 200:1, and reacting the mixture under heat in an atmosphere inert to the reaction to bond at least some of the silicon atoms of the polycarbosilane to the metal atoms of the organic metal compound through oxygen atoms and form an organic metallic polymer having a number average molecular weight of about 700 to 100,000;

a second step of preparing a spinning dope of the organic metal polymer and spinning it;

a third step of rendering the spun fibers insoluble under tension or under no tension; and a fourth step of calcining the infusible fibers at a temperature of 800° to 1800° C. in vacuum or in an atmosphere of an inert gas.

The inorganic fibers contain 30 to 60% by weight of Si, 0.5 to 35% by weight, preferably 1 to 10% by weight, of Ti or Zr, 25 to 40% by weight of C, and 0.01 to 30% by weight of O.

The inorganic fibers may be used in various forms, for example in the form of a blend of these fibers arranged monoaxially or multiaxially, a woven fabric such as a fabric of the plain, satin, imitation gauze, twill or leno weave or a helically or three-dimensionally woven fabric, or chopped strands.

The proportion of the inorganic fibers in the hybrid fibers is at least 10%, preferably at least 20%. If it is below 10%, there is a decrease in the effect of the inorganic fibers to improve the interlayer shear strength, flexural impact strength and fatigue strength of the composite material of the invention by increasing the strength of bonding between the plastic and fibers, increasing the reinforcing efficiency and decreasing the fatigue strength reduction with the use of the inorganic fibers.

The hybrid types of the hybrid fibers are basically (1) an interlayer hybrid composed of a layer of one kind of fibers and a layer of another kind of fibers which are stacked alternately, and (2) an interlayer hybrid in which the two fiber layers are hybridized in one layer. There is also (3) a combination of these types. The following six types are main combinations.

(a) A stack of layers of dissimilar fibers laid alternately.

(b) A sandwich type (a stack of layers of dissimlar fibers laid in sandwich form).

(c) A rib-reinforced type.

(d) A mixed tow (a hybridization of dissmilar monofilaments).

(e) A stack of mixed fiber tapes (a hybridization of dissimilar yarns within a layer).

(f) A mixed fiber surface layer.

Figure 1B:
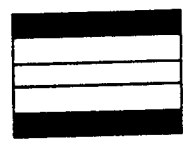
Figure 1C:
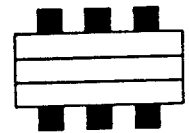
Figure 1D:
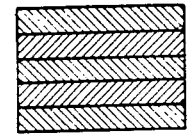
Figure 1E:
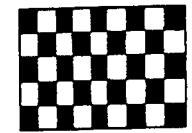
Figure 1F:
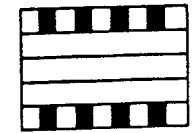

The above hybrid types are shown roughly in FIG. 1.

Examples of plastics that can be used in this invention include epoxy resins, polyester resins, phenolic resins, polyimide resins, polyurethane resins, polyamide resins, polycarbonate resins, silicone resins, fluorine resins, polyphenylene sulfide, polyethylene, polypropylene, modified polyphenylene oxide, polystyrene, ABS resin, vinyl chloride resins, and mixtures of these.

The hybrid fiber-reinforced plastic composite material of this invention may be produced by ordinary methods of producing fiber-reinforced plastic composite materials, such as (1) the hand layup method, (2) the matched metal die method, (3) the break away method, (4) the filament winding method, (5) the hot press method, (6) the autoclave method, and (7) the continuous pulling method.

(1) According to the hand lay up method, the composite material can be produced by cutting the hybrid fibers, laying them up on a mold, coating the plastic containing a catalyst on the laid fibers by means of a brush or roller, allowing it to cure spontaneously, and then removing the mold.

(2) According to the matched metal die method, the composite material can be produced by impregnating the hybrid fibers with a mixture of the plastic, a curing agent, a filler and a thickening agent, and molding the impregnated fibers under heat and pressure. Depending upon the form of the material during molding, either a sheet molding compound method or a bulk molding compound method can be selected.

(3) According to the break away method, the composite material can be produced by impregnating a sheet of the hybrid fibers with the plastics, pre-curing the impregnated sheet to form a prepreg, winding the prepreg about a tapered mandrel, curing the prepreg and pulling out the cured sheet from the spindle. A hollow article having a complex configuration is produced by this method.

(4) According to the filament winding method, the composite material can be produced by impregnating the hybrid fibers with a thermosetting resin such as an epoxy resin or an unsaturated polyester resin, winding the impregnated fibers about a mandrel, curing the resin, and then removing the mold. As required, either a wet method or a dry method (using a prepreg tape) can be selected.

(5) According to the hot press method, a composite material in the form of a plate can be produced by stacking prepreg sheets in one direction or at any desired angle, and compressing the stacked assembly under heat and pressure.

(6) According to the autoclave method, the composite material can be produced by stacking prepregs in a mold, enveloping them with a special rubber, placing the enveloped material in a high-pressure kettle under vacuum, and heating it under pressure to effect curing. This method is suitable for forming articles of a complex shape.

(7) According to the continuous pulling method, a long strip of composite material can be produced by separately feeding the hybrid fibers and the plastics into a molding machine, mixing them just in front of the mold, and passing the molded mixture through a heating furnace.

The tensile strength ($\sigma_c$) of the composite material produced from the hybrid fibers and the plastic matrix is defined by the following equation.

$$\sigma_c = \sigma_f V_f + \sigma_M V_M$$

wherein $\sigma_c$: the tensile strength of the composite material,
$\sigma_f$: of the tensile strength of the hybrid fibers,
$\sigma_M$: the tensile strength of the plastic matrix,
$V_f$: the volume percent of the hybrid fibers,
$V_M$: the volume percent of the plastic matrix.

As shown by the above equation, the strength of the composite material increases with increasing volume percent of the hybrid fibers in the composite material. Hence, to produce a composite material having high strength, it is necessary to increase the volume percent of the hybrid fibers. If, however, the volume percent of the hybrid fibes exceeds 70%, the amount of the plastic matrix is small and the interstices among the fibers cannot be fully filled with the plastic matrix. The resulting composite material cannot have the strength specified in this invention. If, on the other hand, the number of the fibers is decreased, the hardness of the composite material represented by the tensile strength is reduced as indicated by the above equation, and to produce a practical composite material, at least 10% of the hybrid fibers must be combined. Accordingly, in the production of the hybrid fiber-reinforced plastic composite material of this invention, best results can be obtained when the volume proportion of the hybrid fibers to be combined is adjusted to 10 to 70%, preferably to 25 to 70%.

The composite material of this invention preferably has an interlayer shear strength of at least about 9 kg/mm² and a flexural impact value of at least about 250 kg-cm/cm².

The mechanical properties of the composite material of this invention varies depending upon the type of the plastic forming the matrix, the hybrid type of the hybrid fibers, the content of the hybrid fibers, the content of the inorganic fibers, etc. For example, composite materials obtained by reinforcing various plastics shown below with hybrid fibers consisting of 45% by volume of the inorganic fibers and 15% by volume of carbon fibers in which the content of the hybrid fibres is 60% by volume have the following mechanical properties.

| Plastic constituting the matrix | Stacked, plain-weave (1) | |
|---|---|---|
| | Interlayer shear strength (kg/mm²) | Tensile strength in a direction perpendicular to the fibers (kg/mm²) |
| Epoxy resin | at least 9 | at least 250 |
| Modified epoxy resin | at least 11 | at least 280 |
| Unsaturated polyester resin | at least 9 | at least 250 |
| Polyimide resin | at least 8 | at least 250 |

| Plastic constituting the matrix | Satin weave (2) | |
|---|---|---|
| | Flexural strength in a direction perpendicular to the fibers (kg/mm²) | Flexural impact value (kg-cm/cm²) |
| Epoxy resin | at least 11 | at least 300 |
| Modified epoxy resin | at least 12 | at least 310 |
| Unsaturated polyester resin | at least 10 | at least 270 |
| Polyimide resin | at least 9 | at least 270 |

(1) Content of the fibers
Longitudinal: 30% by volume
Transverse: 30% by volume
(2) Content of the fibers
Longitudinal: 45% by volume
Transverse: 15% by volume The interlayer shear strength and flexural impact value of each composite material in the above table are the lowest values among those measured in the longitudinal and transverse directions of the mix-woven fibers.

The various mechanical properties of the composite material of this invention are measured by the following methods.

(a) Interlayer shear strength

A composite material sample (10×12×2 mm) is placed on two pins each having a length of 20 mm and a radius of curvature of 6 mm, and compressed by a presser having a radius of curvature of 3.5 mmR at its end by the so-called three-point bending method. The interlayer shear stress (kg/mm²) is measured and defined as the interlayer shear strength.

(b) Flexural impact value

The flexural impact value is measured by the Charpy testing method (JIS K 7111) by three-point bending, and expressed in kg-cm/cm².

(c) Tensile strength and tensile modulus

The thickness of the test piece is 2 mm. A curvature of 125 mmR is provided in the central part in the thickness direction and the central part is finished in a thickness of about 1 mm. The tensile test is carried out at a stretching speed of 1 mm/min. The tensile strength is expressed in kg/mm², and the tensile modulus, in tons/mm².

(d) Flexural strength and flexural modulus

The thickness of the test piece is 2 mm. A curvature of 125 mmR is provided in the central part in the thickness direction and the central part is finished in a thickness of about 1 mm. The test piece is subjected to the 3-point bending method. The flexural strength is expressed in kg/mm², and the flexural modulus, in tons/mm².

The interlayer shear strength and flexural impact value are indices which express the strength of bonding between the plastic and fibers. If the interlayer shear strength is low, the strength of bonding between the resin and the fibers is low, and the fibers tend to come off from the resin on long-term use. If the flexural impact value is low, the composite material might be broken by instantenous impact.

Since the hybrid fiber-reinforced plastic composite material has excellent mechanical properties such as high interlayer shear strength and flexural impact value and excellent strength of bonding between the plastic and the fibers, they can withstand use in rigorous environments for an extended period of time. Accordingly, the composite material of this invention can be applied to fields in which conventional hybrid-fiber reinforced plastic composite materials cannot be used satisfactorily. Examples of such fields of application include building materials, materials for aircraft and space exploitation, materials for ships, materials for land transporting machinery, materials for corrosion-resistant machines and instruments, electrical materials, sporting goods, machine elements, materials for therapeutical appliances and instrument, and materials for acoustic appliances and instruments.

The following examples illustrate the present invention more specifically.

Production of inorganic fibers (I)

Titanium alkoxide was added to polycarbosilane produced by adding 3 parts by weight of polyborosiloxane to 100 parts by weight of polydimethylsilane synthesized by dechlorinating and condensing dimethyldichlorosilane with metallic sodium and subjecting the mixture to condensation at 350° C. in nitrogen and having a main-chain skeleton composed mainly of carbosilane units of the formula $+Si-CH_2+$ in which the silicon atoms had hydrogen atoms and methyl groups. The mixture was crosslinked and polymerized at 340° C. in nitrogen to obtain polytitanocarbosilane composed of 100 parts of carbosilane units and 10 parts of titanoxane units of the formula $+Ti-O+$. The polymer was melt-spun. The resulting fibers were rendered infusible at 190° C. in air, and subsequently calcined at 1300° C. in nitrogen to give inorganic fibers (I) containing mainly silicon, titanium (3% by weight), carbon and oxygen and having a fiber diameter of 13 microns, a tensile strength of 310 kg/mm$^2$ and a tensile modulus of 16 tons/mm$^2$. The resulting fibers were a mixture of an amorphous material composed of Si, Ti, C and O, with an aggregate of ultrafine crystalline particles having a particle diameter of about 50 Å of beta-SiC, TiC, a solid solution of beta-SiC and TiC and $TiC_{1-x}$ ($0<x<1$), and amorphous $SiO_2$ and $TiO_2$.

Production of inorganic fibers (II)

Tetrakisacetylacetonatozirconium was added to the polycarbosilane obtained as above, and the mixture was crosslinked and polymerized at 350° C. in nitrogen to give polyzirconocarbosilane composed of 100 parts of carbosilane units and 30 parts of zirconoxane units of the formula $+Zr-O+$. The polymer was dissolved in benzene, and the solution was dry-spun. The fibers were rendered infusible at 170° C. in air, and subsequently calcined at 1200° C. in nitrogen to give amorphous inorganic organic fibers (II) containing mainly silicon, zirconium (4.5% by weight), carbon and oxygen and having a fiber diameter of 10 microns, a tensile strength of 350 kg/mm$^2$ and a tensile modulus of 18 tons/mm$^2$.

EXAMPLE 1

The inorganic fibers (I) were aligned monoaxially in sheet form, and impregnated with an epoxy resin (commercial bisphenol A-type) which was then precured to form prepreg sheets. Similarly, surface-treated carbon fibers (polyacrylonitrile fibers, fiber diameter 7 microns) were aligned monoaxially in sheet form and impregnated with an epoxy resin to form prepreg sheets. The prepregs of the inorganic fibers and the prepregs of the carbon fibers were alternately stacked with their axial directions being kept the same. The stacked assembly was hot-pressed to produce a hybrid fiber (inorganic fibers (I)/carbon fibers)-reinforced epoxy composite material. This composite material contained 30% by volume of the inorganic fibers (I) and 30 parts of the carbon fibers. The resulting composite material had a tensile strength of 170 kg/mm$^2$, a tensile modulus of 11.1 tons/mm$^2$, a flexural strength of 100 kg/mm$^2$, a flexural modulus of 8.2 tons/mm$^2$, an interlayer shear strength of 12.0 kg/mm$^2$, and a flexural impact value of 300 kg-cm/cm$^2$. When the hybrid fibers were oriented monoaxially as in the present Example, the tensile strength, tensile modulus, flexural strength and flexural modulus were measured in the oriented direction of the fibers.

EXAMPLE 2

Plain-weave cloths were produced by using the same carbon fibers as used in Example 1 as warps and the inorganic fibers (I) as wefts, and impregnated with the same epoxy resin as used in Example 1 to form prepreg sheets. These prepregs were stacked, and then hot-pressed to produced a hybrid fiber (inorganic fibers (I)/carbon fibers)-reinforced epoxy composite material. The composite material contained 30% by volume of the inorganic fibers (I) and 30% by volume of the carbon fibers, and had a tensile strength of 95 kg/mm$^2$, a tensile modulus of 7.5 tons/mm$^2$, a flexural strength of 92 kg/mm$^2$, a flexural modulus of 7.8 tons/mm$^2$, an interlayer shear strength of 11.3 kg/mm$^2$ and a flexural impact value of 290 kg-cm/cm$^2$.

EXAMPLE 3

Eight satin-weave cloths were producing using the same carbon fibers as used in Example 1 as warps and the inorganic fibers (I) as wefts, and impregnated with the same epoxy resin as used in Example 1 to form prepreg sheets. The resulting prepregs were stacked, and then hot-pressed to produce a hybrid fiber (inorganic fibers (I)/carbon fibers)-reinforced composite material. The resulting composite material contained 15% by volume of the inorganic fibers (I) and 45% by volume of carbon fibers, and had a tensile strength of 130 kg/mm$^2$, a tensile modulus of 10.5 tons/mm$^2$, a flexural strength of 90 kg/mm$^2$, a flexural modulus of 7.7 tons/mm$^2$, an interlayer shear strength of 12.5 kg/mm$^2$ and a flexural impact value of 320 kg-cm/cm$^2$.

EXAMPLE 4

The inorganic fibers (I) were aligned monoaxially in sheet form. The same epoxy resin as used in Example 1 was impregnated into the sheets and pre-cured to form prepreg sheets. Similarly, glass fibers (E glass) were aligned monoaxially in sheet form, and then impregnated with an epoxy resin to form prepreg sheets. The prepregs of the inorganic fibers (I) and the prepregs of the glass fibers were stacked alternately at right angles to each other, and then hot-pressed to produce a hybrid fiber (inorganic fibers (I)/glass fibers)reinforced epoxy composite material. The resulting composite material contained 30% by volume of the inorganic fibers (I) and 30% by volume of the glass fibers, and had a tensile strength of 97 kg/mm$^2$, a tensile modulus of 85 tons/mm$^2$, a flexural strength of 93 kg/mm$^2$, a flexural modulus of 7.5 tons/mm$^2$, an interlayer shear strength of 10.5 kg/mm$^2$, and a flexural impact value of 280 kg-cm/cm$^2$.

EXAMPLE 5

Plain-weave cloths were produced by using the same glass fibers as used in Example 4 as warps and the inorganic fibers (I) as wefts, and impregnated with the same epoxy resin as used in Example 1 to form prepreg sheets. The resulting prepreg sheets were stacked, and then hot-pressed to produce a hybrid fiber (inorganic fibers (I)/glass fibers)-reinforced epoxy composite material. The resulting composite material contained 30% by volume of the inorganic fibers and 30% by volume of the glass fibers, and had a tensile strength of 95 kg/mm$^2$, a tensile modulus of 5.6 tons/mm$^2$, a flexural strength of 95 kg/mm$^2$, a flexural modulus of 7.6 tons/mm$^2$, an interlayer shear strength 10.6 kg/mm$^2$ and a flexural impact value of 285 kg-cm/cm$^2$.

EXAMPLE 6

Eight satin-weave cloths were produced by using boron fibers having a diameter of 100 micrometers as warps and the inorganic fibers (I) as wefts, and impregnated with the same epoxy resin as used in Example 1 to form prepreg sheets. The resulting prepregs were stacked, and hot-pressed to produce a hybrid fiber (inorganic fibers (I)/boron fibrs)-reinforced epoxy composite material. The resulting composite material contained 15% by volume of the inorganic fibers (I) and 45% by volume of the boron fibers, and had a tensile strength of 155 kg/mm$^2$, a tensile modulus of 17.5 tons/mm$^2$, a flexural strength of 122 kg/mm$^2$, a flexural modulus of 8.8 tons/mm$^2$, an interlayer shear strength of 12.3 kg/mm$^2$, and a flexural impact value of 300 kg-cm/cm$^2$.

EXAMPLE 7

Eight satin-weave cloths were produced by using silicon carbide fibers having a diameter of 140 micrometers and containing a carbon core as warps and the inorganic fibers (I) as wefts, and impregnated with the same epoxy resin as used in Example 1 to form prepreg sheets. The resulting prepregs were stacked, and then hot-pressed to produce a hybrid fiber (inorganic fibers (I)/silicon carbide fibers)-reinforced epoxy composite material. The resulting composite material contained 15% by volume of the inorganic fibers (I) and 45% by volume of the silicon carbide fibers, and had a tensile strength of 157 kg/mm$^2$, a tensile modulus of 185 tons/mm$^2$, a flexural strength of 111 kg/mm$^2$, a flexural modulus of 9.5 tons/mm$^2$, an interlayer shear strength of 12.0 kg/mm$^2$ and a flexural impact value of 292 kg-cm/cm$^2$.

EXAMPLE 8

Eight satin-weave cloths were produced by using commercial Kevlar as warps and the inorganic fibers (I) as wefts, and impregnated with the same epoxy resin as used in Example 1 to form prepreg sheets. The prepregs were stacked and then hot-pressed to produce a hybrid fiber (inorganic fibers (I)/Kevlar)-reinforced epoxy composite material. The resulting composite material contained 30% by volume of the inorganic fibers (I) and 30% by volume of Kevlar, and had a tensile strength of 98 kg/mm$^2$, a tensile modulus of 5.5 tons/mm$^2$, a flexural strength of 87 kg/mm$^2$, a flexural modulus of 7.3 tons/mm$^2$, an interlayer shear strength of 10.5 kg/mm$^2$, and a flexural impact value of 265 kg-cm/cm$^2$.

EXAMPLE 9

Plain-weave cloths were produced using the same carbon fibers as used in Example 1 as warps and the inorganic fibers (II) as wefts, and impregnated with an epoxy resin to form prepreg sheets. The resulting prepregs were stacked and then hot-pressed to produce a hybrid fiber (inorganic fibers (II)/carbon fibers)-reinforced epoxy composite material. The resulting composite material contained 30% by volume of the inorganic fibers (II) and 30% by volume of the carbon fibers, and had a tensile strength of 95 kg/mm$^2$, a tensile modulus of 7.5 tons/mm$^2$, a flexural strength of 102 kg/mm$^2$, a flexural modulus of 8.5 tons/mm$^2$, an interlayer shear strength of 12.3 kg/mm$^2$ and a flexural impact value of 285 kg-cm/cm$^2$.

COMPARATIVE EXAMPLE 1

The same carbon fibers as used in Example 1 were monoaixally aligned in sheet form, and impregnated with an epoxy resin which was then pre-cured to give prepreg sheets. The prepreg sheets were stacked and hot-pressed to produce a carbon fiber-reinforced epoxy composite material. The resulting composite material contained 60% by volume of the carbon fibers and had a tensile strength of 65 kg/mm$^2$, a tensile modulus of 6.2 tons/mm$^2$, a flexural strength of 80 kg/mm$^2$, a flexural modulus of 5.2 tons/mm$^2$, an interlayer shear strength of 4.5 kg/mm$^2$, and a flexural impact value of 110 kg-cm/cm$^2$.

COMPARATIVE EXAMPLE 2

Plain-weave cloths were produced by using the same carbon fibers as used in Example 1, and impregnated with an epoxy resin to form prepreg sheets. The resulting prepregs were stacked, and then hot-pressed to give a carbon fiber-reinforced epoxy composite material. The resulting composite material had a tensile strength of 68 kg/mm$^2$, a tensile modulus of 6.6 tons/mm$^2$, a flexural strength of 86 kg/mm$^2$, a flexural modulus of 5.9 tons/mm$^2$, an interlayer shear strength of 7.1 kg/mm$^2$, and a flexural impact value of 120 kg-cm/cm$^2$.

COMPARATIVE EXAMPLE 3

Eight satin-weave cloths were produced by using the same carbon fibers as used in Example 1, and impregnated with an epoxy resin to form prepreg sheets. The prepreg sheets were stacked, and then hot-pressed to produce a carbon fiber-reinforced epoxy composite material. The resulting composite material contained 60% by volume of the carbon fibers, and had a tensile strength of 58 kg/mm$^2$, a tensile modulus of 6.4 tons/mm$^2$, a flexural strength of 83 kg/mm$^2$, a flexural modulus of 5.8 tons/mm$^2$, an interlayer shear strength of 5.7 kg/mm$^2$ and a flexural impact value of 115 kg-cm/cm$^2$.

COMPARATIVE EXAMPLE 4

Plain-weave cloths were produced by using the same glass fibers as used in Example 4, and impregnated with the same epoxy resin as used in Example 1 to form prepreg sheets. The prepreg sheets were stacked, and then hot-pressed to produce a glass fiber-reinforced epoxy composite material. The resulting composite material contained 60% by volume of the glass fibers, and had a tensile strength of 48 kg/mm$^2$, a tensile modulus of 1.8 tons/mm$^2$, a flexural strength of 46 kg/mm$^2$, a flexural modulus of 1.6 tons/mm$^2$, an interlayer shear strength of 4.0 kg/mm$^2$ and a flexural impact value of 50 kg-cm/cm$^3$.

COMPARATIVE EXAMPLE 5

Satin-weave cloths were produced by using Kevlar fibers, and impregnated with an epoxy resin to form prepreg sheets. The prepreg sheets were stacked, and then hot-pressed to produce a Kevlar-reinforced epoxy composite material. The resulting composite material contained 60% by volume of the Kevlar fibers, and had a tensile strength of 70 kg/mm$^2$, a tensile modulus of 3.2 tons/mm$^2$, a flexural strength of 65 kg/mm$^2$, a flexural modulus of 3.0 tons/mm$^2$, an interlayer shear strength of 4.5 kg/mm$^2$, and a flexural impact value of 90 kg-cm/cm$^2$.

COMPARATIVE EXAMPLE 6

Eight satin-weave cloths were produced by using the same carbon fibers as used in Example 1, and impregnated with an unsaturated polyester resin to form prepreg sheets. The prepreg sheets were stacked, and then hotpressed to produce a carbon fiber-reinforced polyester composite material. The resulting composite material contained 60% by volume of the carbon fibers, and had a tensile strength of 43 kg/mm$^2$, a tensile modulus of 3.7 tons/mm$^2$, a flexural strength of 56 kg/mm$^2$, a flexural modulus of 3.0 tons/mm$^2$, an interlayer shedar strength of 3.5 kg/mm$^2$, and a flexural impact value of 105 kg-cm/cm$^2$.

COMPARATIVE EXAMPLE 7

Eight satin-weave cloths were produced by using the same carbon fibers as used in Example 1, and impregnated with a polyimide resin to form prepreg sheets. The prepreg sheets were stacked, and then hot-pressed to produce a carbon fiber-reinforced polyimide composite material. The resulting composite material contained 60% by volume of the carbon fibers, and had a tensile strength of 70 kg/mm$^2$, a tensile modulus of 6.8 tons/mm$^2$, a flexural strength of 88 kg/mm$^2$, a flexural modulus of 6.1 tons/mm$^2$, an interlayer shear strength of 7.0 kg/mm$^2$, and a flexural impact value of 123 kg-cm/cm$^2$.

COMPARATIVE EXAMPLE 8

Plain-weave cloths were produced by using the same carbon fibers as used in Example 1, and impregnated with nylon-66 to form prepreg sheets. The prepreg sheets were stacked, and then hot-pressed to produce a carbon fiber-reinforced nylon-66 composite material. The resulting composite material contained 30% by volume of the carbon fibers, and had a tensile strength of 35 kg/mm$^2$, a tensile modulus of 3.0 tons/mm$^2$, a flexural strength of 45 kg/mm$^2$, a flexural modulus of 2.5 tons/mm$^2$, an interlayer shear strength of 3.5 kg/mm$^2$, and a flexural impact value of 80 kg/mm$^2$.

EXAMPLE 10

Eight satin-weave cloths were produced by using the same carbon fibers as used in Example 1 as warps and the inorganic fibers (I) as wefts, and impregnated with the same commercial unsaturated polyester resin as used in Comparative Example 6 to form prepreg sheets. The resulting prepregs were stacked, and then hot-pressed to produce a hybrid fiber (inorganic fiber (I)/carbon fiber)-reinforced polyester composite material. The resulting composite material contained 15% by volume of the inorganic fibers (I) and 45% by volume of the carbon fibers, and had a tensile strength of 87 kg/mm$^2$, a tensile modulus of 7.1 tons/mm$^2$, a flexural strength of 74 kg/mm$^2$, a flexural modulus of 7.0 tons/mm$^2$, an interlayer shear strength of 10.2 kg/mm$^2$, and a flexural impact value of 275 kg-cm/cm$^2$.

EXAMPLE 11

Eight satin-weave cloths were produced by using the same carbon fibers as used in Example 1 as warps and the inorganic fibers (I) as wefts, and impregnated with the same polyimide resin as used in Comparative Example 7 (Upirex, a tradename of a product of Ube Industries, Ltd.) to form prepreg sheets. The resulting prepregs were stacked, and then hot-pressed to produce a hybrid fiber (inorganic fiber (I)/carbon fiber)-reinforced polyimide composite material. The resulting composite material contained 15% by volume of the inorganic fibers (I) and 45% by volume of the carbon fibers, and had a tensile strength of 76 kg/mm$^2$, a tensile modulus of 6.8 tons/mm$^2$, a flexural strength of 68 kg/mm$^2$, a flexural modulus of 6.7 tons/mm$^2$, an interlayer shear strength of 9.9 kg/mm$^2$, and a flexural impact value of 270 kg-cm/cm$^2$.

EXAMPLE 12

Plain-weave cloths were produced by using the same carbon fibers as used in Example 1 as warps and the inorganic fibers (I) as wefts, and impregnated with nylon 66 to form prepreg sheets. The resulting prepregs were stacked, and then hot-pressed to produce a hybrid fiber (inorganic fiber (I)/carbon fiber)-reinforced nylon composite material. The resulting composite material contained 15% by volume of the inorganic fibers (I) and 45% by volume of the carbon fibers, and had a tensile strength of 125 kg/mm$^2$, a tensile modulus of 9.8 tons/mm$^2$, a flexural strength of 78 kg/mm$^2$, a flexural modulus of 7.2 tons/mm$^2$, an interlayer shear strength of 10.2 kg/mm$^2$, and a flexural impact value of 280 kg-cm/cm$^2$.

EXAMPLE 13

Example 1 was repeated except that commercial phenol novolak-type modified epoxy resin was used instead of the bisphenol A-type epoxy resin. There was obtained a hybrid fiber-reinforced modified epoxy resin composite modulus of 13.2 tons/mm$^2$, a flexural strength of 115 kg/mm$^2$, a flexural modulus of 9.7 tons/mm$^2$, an interlayer shear strength of 19.8 kg/mm$^2$ and a flexural impact value of 317 kg-cm/cm$^2$.

What is claimed is:

1. A hybrid fiber-reinforced plastic composite material comprising a matrix of a plastic and hybrid fibers consisting of inorganic fibers and at least one kind of fibers selected from the group consisting of carbon fibers, glass fibers, boron fibers, aramide fibers and silicon carbide fibers having a carbon core, wherein (a) the inorganic fibers are inorganic fibers containing silicon, either titanium or zirconium, carbon and oxygen and being composed of
  (i) an amorphous material consisting substantially of Si, M, C and O where M represents Ti or Zr, or
  (ii) an aggregate consisting substantially of ultra-fine crystalline particles with a particle diameter of not more than 500 Å of $\beta$-SiC, MC, a solid solution of $\beta$-SiC and MC and $MC_{1-x}$, and amorphous $SiO_2$ and $MO_2$, where M is as defined and x is a number represented by $0<x<1$, or
  (iii) a mixture of the amorphous material (i) and the aggregate (ii),
(b) the composite material has an interlayer shear strength of at least about 9 kg/mm$^2$, and
(c) the composite material has a flexural impact value of at least about 250 kg-cm/cm$^2$.

2. The composite material of claim 1 wherein the plastic is at least one material selected from the group consisting of epoxy resins, polyester resin, phenolic resins, polyimide resins, polyurethane resins, polyamide resins, polycarbonate resins, silicone resins, fluorine resins, polyphenylene sulfide, polyethylene, polypropylene, modified polyphenylene oxide, polystyrene, ABS resin and vinyl chloride resins.

3. The composite material of claim 1 wherein the inorganic fibers contain 30 to 60% by weight of Si, 0.5 to 35% by weight of Ti or Zr, 25 to 40% by weight of C, and 0.01 to 30% by weight of O.

4. The composite material of claim 1 wherein the proportion of the hybrid fibers is 10 to 70% by volume based on the entire composite material.

5. The composite material of claim 1 wherein the porportion of the inorganic fibers is at least 10% by volume based on the hybrid fibers.

6. The composite material of claim 1 wherein the hybrid fibers are incorporated in the plastic monoaxially or multiaxially.

7. The composite material of claim 1 wherein the hybrid fibers are in the form of a woven cloth selected from the group consisting of a plain-weave fabric, a satin-weave fabric, an imitation gauze-weave fabric, a twill-weave fabric, a leno-weave fabric, a helically woven fabric and a three-dimensionally woven fabric.

8. The composite material of claim 1 wherein the hybrid fibers are in the form of chopped strands.

* * * * *